United States Patent
Woodward et al.

(10) Patent No.: US 9,262,411 B2
(45) Date of Patent: Feb. 16, 2016

(54) SOCIALLY DERIVED TRANSLATION PROFILES TO ENHANCE TRANSLATION QUALITY OF SOCIAL CONTENT USING A MACHINE TRANSLATION

(71) Applicant: International Business Machines Corporation, Armonk, NY (US)

(72) Inventors: Elizabeth V. Woodward, Cedar Park, TX (US); Shunguo Yan, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 307 days.

(21) Appl. No.: 13/938,804

(22) Filed: Jul. 10, 2013

(65) Prior Publication Data
US 2015/0019200 A1    Jan. 15, 2015

(51) Int. Cl.
 *G06F 17/28* (2006.01)
 *G06Q 50/00* (2012.01)
 *G06F 17/27* (2006.01)

(52) U.S. Cl.
 CPC .......... *G06F 17/289* (2013.01); *G06F 17/2836* (2013.01); *G06Q 50/01* (2013.01); *G06F 17/2735* (2013.01)

(58) Field of Classification Search
 CPC .............. G06F 17/2735; G06F 17/289; G06F 17/2836; G06F 17/28
 See application file for complete search history.

(56) References Cited

U.S. PATENT DOCUMENTS

| 6,002,997 | A | 12/1999 | Tou | |
| 6,996,520 | B2 | 2/2006 | Levin | |
| 8,032,355 | B2 | 10/2011 | Narayanan et al. | |
| 2001/0029455 | A1* | 10/2001 | Chin et al. | 704/277 |
| 2002/0123878 | A1* | 9/2002 | Menke | 704/2 |
| 2003/0033312 | A1* | 2/2003 | Koizumi et al. | 707/100 |
| 2004/0102957 | A1* | 5/2004 | Levin | 704/3 |
| 2007/0238076 | A1 | 10/2007 | Burstein et al. | |
| 2009/0281789 | A1* | 11/2009 | Waibel et al. | 704/3 |
| 2010/0030551 | A1* | 2/2010 | Ark et al. | 704/8 |
| 2010/0114887 | A1* | 5/2010 | Conway et al. | 707/737 |
| 2012/0271828 | A1* | 10/2012 | Raghunath | 707/739 |
| 2013/0124185 | A1* | 5/2013 | Sarr et al. | 704/2 |
| 2015/0019200 | A1* | 1/2015 | Woodward et al. | 704/2 |

FOREIGN PATENT DOCUMENTS

WO    2010/062540 A1    6/2010

OTHER PUBLICATIONS http://www25.brinkster.com/mohammedsharaf/MAThesis/033.htm, "Machine Translation Processes: Lexical Ambiguity" printed Jun. 12, 2013.

* cited by examiner

*Primary Examiner* — Samuel G Neway
(74) *Attorney, Agent, or Firm* — Scully, Scott, Murphy & Presser, P.C.; William Stock, Esq.

(57) ABSTRACT

The present disclosure relates generally to the field of socially derived translation profiles to enhance translation quality of social content using a machine translation. In various embodiments, methodologies may be provided that automatically use socially derived translation profiles to enhance translation quality of social content using a machine translation.

21 Claims, 5 Drawing Sheets

FIG. 1

| CONTENT | CONTEXTUAL INFORMATION FROM THE SAME SOCIAL NETWORK | AUTHOR | CONTENT-SPECIFIC DICTIONARY (EN -- CH) |
|---|---|---|---|
| CAPTION THIS FOR AT USERS | VIDEO DISCUSSION GROUP<br><br>TAGS: VIDEO, MEDIA, CAPTION, DISABLED, AT<br><br>CAPTIONING<br><br>ACCESSIBILITY<br><br>MULTILINGUAL | NAME: JOHN SMITH<br>ORIGIN: ENGLAND<br>PROFESSION: SOCIAL MEDIA & ONLINE CONTENT ANALYSIS<br><br>TITLE: ANALYST AND ADVOCATE OF ACCESSIBILITY<br>OTHER POSTS: ACCESSIBILITY (108, 57%), MEDIA (59, 29%) | CAPTION: 字幕<br>AT: 视屏自助器<br>DISABLED: 残疾者<br>ACCESSIBILITY: 无障碍<br>MULTILINGUAL: 多语言<br>MEDIA: 媒体 |

SOCIALLY DERIVED TRANSLATION PROFILES TO ENHANCE TRANSLATION QUALITY OF SOCIAL CONTENT USING A MACHINE TRANSLATION

BACKGROUND

Conventional machine translation typically uses linguistic rules to translate source text from one language to another. Machine translation also typically uses corpus and/or statistic techniques to recognize idioms, phrases and sentences, and find their closest counterparts in the target language. A machine translation engine will often allow for customization by domain or industry (such as, for example, IT industry, US government, criminal document) to improve the output by limiting the scope of allowable substitutions.

In the social networking field, social content (such as a message post in a blog or forum, a comment, tag, or short description) typically has the following characteristics: (1) usually not in formal written format, may be spoken style; (2) usually short, may not be a complete sentence or paragraph; (3) may utilize incorrect grammar; (4) semantics not always consistent, for instance, the subject or topics may change suddenly.

Even in view of these characteristics, the meaning of a given social content can often be well determined by a person in a social network because the given social content usually has additional contextual information, such as message threads, subject, topic, description, tags, user comments/replies or even two users' common backgrounds.

However, when a given social content is sent to a machine translation engine for translation, most of the descriptive context from the social network is typically lost. Therefore, such social content may be subject to ambiguity during translation, and lead to poor translation quality.

SUMMARY

The present disclosure relates generally to the field of socially derived translation profiles to enhance translation quality of social content using a machine translation (sometimes referred to herein as "MT").

In various embodiments, methodologies may be provided that automatically use socially derived translation profiles to enhance translation quality of social content using a machine translation.

In one embodiment, a method implemented in a computer system for translating content, wherein the content has an author who is part of a social network is provided, the method comprising: receiving the content by the computer system; retrieving from the social network, by the computer system, contextual information associated with the content; retrieving from the social network, by the computer system, author information associated with the author; creating, by the computer system, a content-specific dictionary based upon the retrieved contextual information and the retrieved author information; creating, by the computer system, a translation profile based upon the retrieved contextual information, the retrieved author information and the created content-specific dictionary; determining, by the computer system, one of a plurality of generic dictionaries to use for the translating, wherein the determination of the one of the plurality of generic dictionaries to use is based upon the translation profile; and translating the received content by the computer system, using the content-specific dictionary and the determined one of the plurality of generic dictionaries to use.

In another embodiment, a computer readable storage medium, tangibly embodying a program of instructions executable by the computer for translating content, wherein the content has an author who is part of a social network is provided, the program of instructions, when executing, performing the following steps: receiving the content; retrieving from the social network contextual information associated with the content; retrieving from the social network author information associated with the author; creating a content-specific dictionary based upon the retrieved contextual information and the retrieved author information; creating a translation profile based upon the retrieved contextual information, the retrieved author information and the created content-specific dictionary; determining one of a plurality of generic dictionaries to use for the translating, wherein the determination of the one of the plurality of generic dictionaries to use is based upon the translation profile; and translating the received content using the content-specific dictionary and the determined one of the plurality of generic dictionaries to use.

In another embodiment, computer-implemented system for translating content, wherein the content has an author who is part of a social network is provided, the system comprising: a receiving element configured to receive the content; a first retrieving element configured to retrieve from the social network contextual information associated with the content; a second retrieving element configured to retrieve from the social network author information associated with the author; a first creating element configured to create a content-specific dictionary based upon the retrieved contextual information and the retrieved author information; a second creating element configured to create a translation profile based upon the retrieved contextual information, the retrieved author information and the created content-specific dictionary; a determining element configured to determine one of a plurality of generic dictionaries to use for the translating, wherein the determination of the one of the plurality of generic dictionaries to use is based upon the translation profile; and a translating element configured to translate the received content using the content-specific dictionary and the determined one of the plurality of generic dictionaries to use.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

As described herein, mechanisms are provided for using information retrieved from a social network (e.g., contextual information and author's language and writing style) to create a translation profile for a given social content. Further, mechanisms are provided to apply the translation profile to a machine translation engine to improve the translation of the given social content.

In various examples, socially derived translation profiles to enhance translation quality of social content using a machine translation may be implemented in the form of systems, methods and/or algorithms.

For the purposes of describing and claiming the present invention the term "social network" is intended to refer to a grouping of people according to one or more relationships between and/or among them. In one example, a social network may include a plurality of members and may be organized and maintained via a computer system.

For the purposes of describing and claiming the present invention the term "social network communication" is intended to refer to a communication made in a social network. In various examples, such communication may be a blog post, a forum post or a wiki post.

For the purposes of describing and claiming the present invention the term "author" is intended to refer to a person who writes or otherwise originates a communication. In various examples, such an authored communication may be written or spoken.

Figure 1:
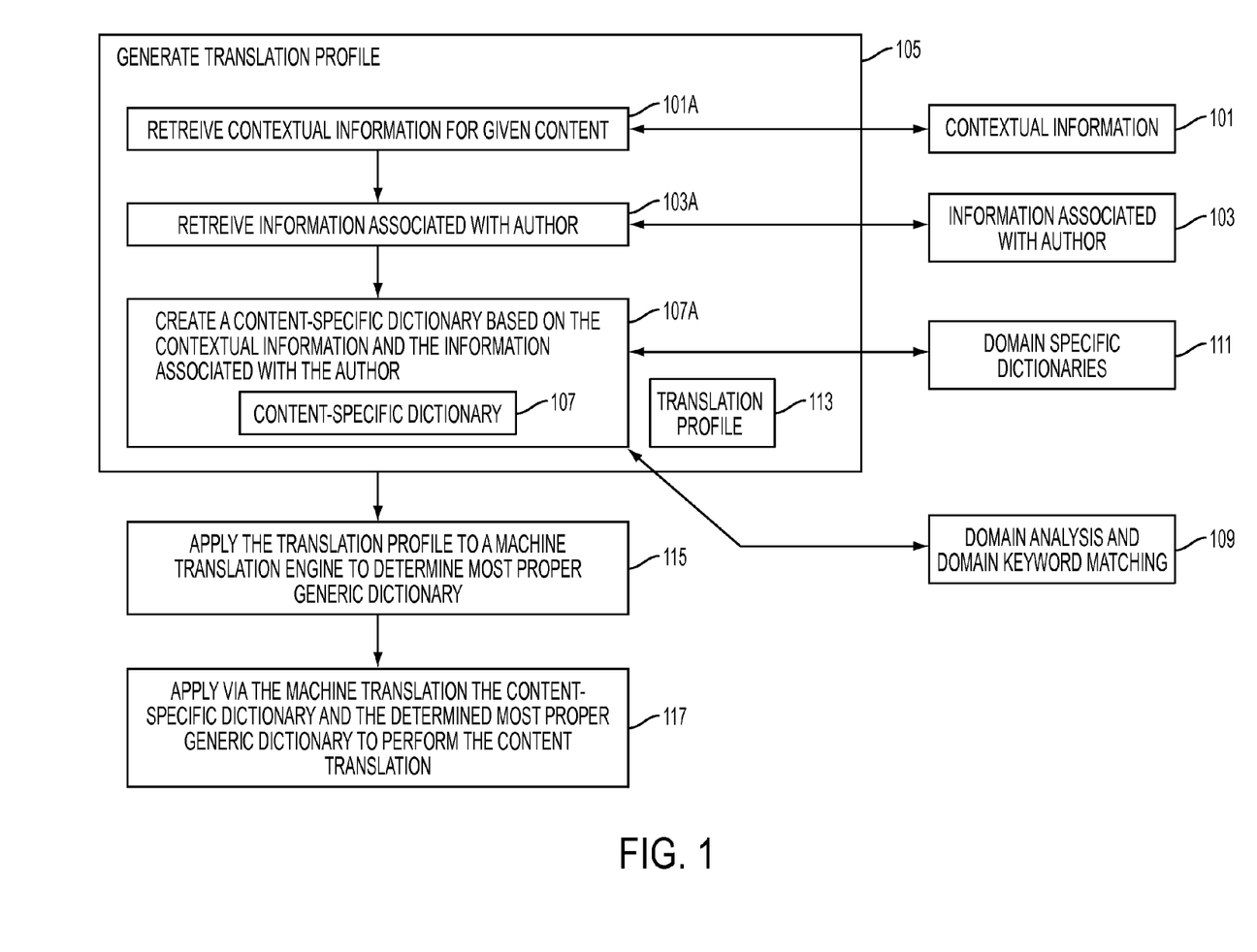
FIG. 1 depicts a block diagram of a method for creating and applying a translation profile according to an embodiment of the present invention.

Referring now to FIG. 1, an example implementation according to an embodiment will be described.

In this example implementation, contextual information 101 (e.g., social contextual information) and information associated with an author 103 (e.g., personal background information) are retrieved (see call out numbers 101A and 103A) during a process to generate a translation profile (see call out number 105). In one specific example, this retrieval may be performed by retrieving the information from the same forum, blog or social network at which the content to be translated resides (e.g., by following a message thread). In another specific example, an analytics tool in a social platform (such as FACEBOOK analytics tool or IBM CONNECTIONS recommendation engine) can be used for the retrieval purpose. In another specific example, the retrieval may be performed by retrieving the information from a location (e.g., a location on the Internet) which is different from the location at which the content to be translated resides.

Still referring to FIG. 1, a content-specific dictionary 107 can be constructed (e.g., dynamically) based upon the retrieved contextual information and the retrieved information associated with the author. In one specific example, the content-specific dictionary can be constructed (see call out number 107A) as follows: (a) Determine the content domain of the content to be translated (this can be done, for example, through domain analysis and/or key word matching process (see call out number 109)); (b) Identify some or all the text entities (e.g., nouns, words and phrases, people's names, places, organizations) from the content to be translated (for example, the following text entities may be identified in a given content: social business, accessibility, AT, collaboration, and IBM). In one specific example, text entities can be identified through Named Entity Recognition and/or Lexalytics techniques (that is, a generic technology used to extract name entities); (c) Use existing online bilingual domain-specific dictionaries 111 for the source and/or the target language (and/or other sources such as, e.g., knowledge base, training materials) to retrieve the key words (in one example, key words are those words that that might have a different meaning in a different domain—for instance, in the scope of FIG. 2 discussed in more detail below, the word "caption" (in the phrase "caption this for AT users") means to "convert speech into text" (the "AT" means Assistive Technology—the accessibility means enabling a disabled user to access electronic documents); once a context for a text to be translated is given, such key words can be determined—for instance, one way is to see if the text entities in a text appear in domain-specific terminologies); (d) Create a library of words commonly used by the context category and the author, and add to the content-specific dictionary. In one specific example, for the ambiguous words, weight each word based on the frequency of the word in its electronic presence as existing in the author's language and writing styles. In another specific example, word ambiguity can be determined syntactically or lexically by machine translation (see, e.g., http://www25.brinkster.com/mohammedsharaf/MAThesis/033.htm). Another specific example of word weight in the context an embodiment is when an ambiguity is encountered (a word may have multiple potential translations (with similar weight)). In this case, the author's language styles from the author's other known electronic presences can be used to determine which translation is more likely, thus giving a higher weight to help the machine translation to make a decision.

Still referring to FIG. 1, the generated translation profile 113 may be applied to a machine translation engine (see call out number 115) to determine the most proper generic dictionary (or dictionaries) from a possible set of dictionaries. Further, the machine translation applies (see call out number 117): (a) the content-specific dictionary 107 (created at call out number 107A); (b) and the generic dictionary (determined call out number 115) for the words and phrases that don't exist in the content-specific dictionary for the translation.

In one specific example, the contextual information 101 may include (but not be limited to): description, tags, comments, subject/title/topic and/or other related posts from one or more social networks (e.g., of which the author of the content to be translated is a part)

In another specific example, the information associated with the author 103 may include (but not be limited to): the author's background, the author's language, the author's writing style, the author's language style, one or more preferences of the author, one or more regional styles associated with the author and/or one or more cultural styles associated with the author.

In another specific example, the information associated with the author 103 may be determined from one or more (but not be limited to): one or more social profiles of the author, one or more posts of the author and/or other information.

In another specific example, one or more features associated with the author (e.g., the author's background, the author's language, the author's writing style, the author's language style, one or more preferences of the author, one or more regional styles associated with the author and/or one or more cultural styles associated with the author) may be determined via analysis of one or more (but not be limited to): one or more social networks, one or more social network profiles, one or more posts, one or more related videos, one or more related audios and/or any other electronic messages (e.g., in one or more social networks).

Figure 2:
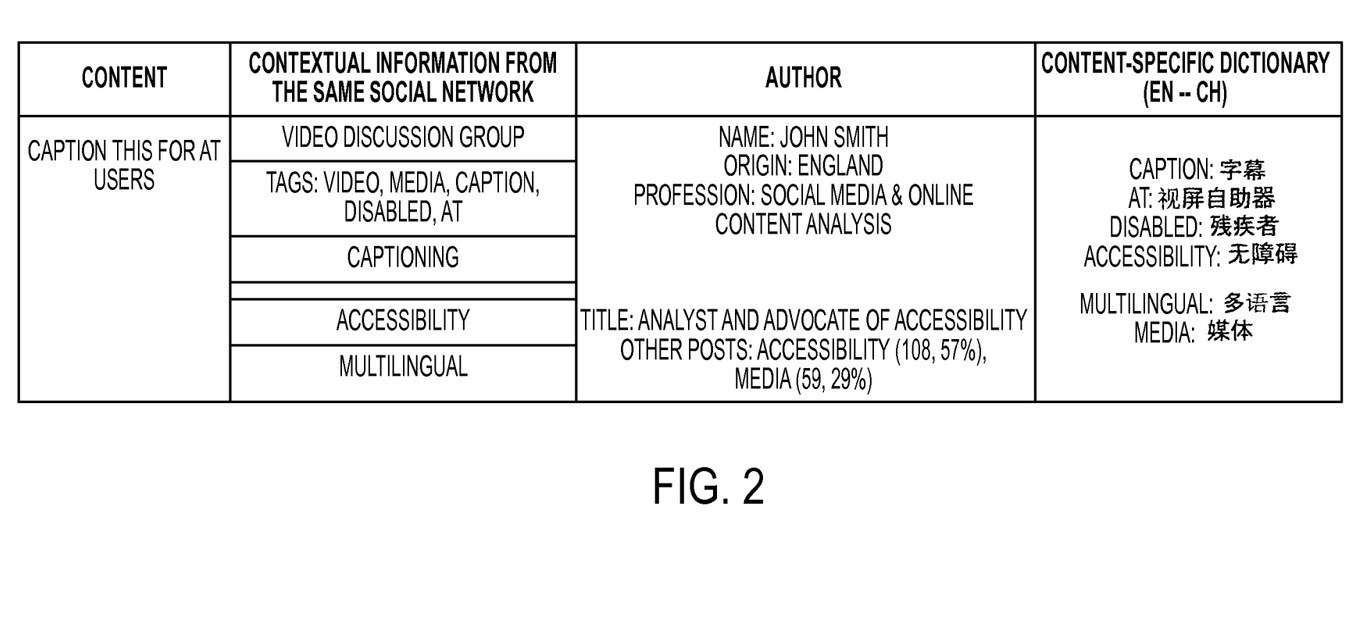
FIG. 2 depicts an example translation profile according to an embodiment of the present invention.

Referring now to FIG. 2, an example translation profile according to an embodiment is shown. In this example, the first column ("Content") is the text to be translated. The text itself is, in one example, posted by a user in a blog etc. The second column ("Contextual information from the same social network") is the context information for the text in the first column, and, in one example, it is drawn from the same blog by analyzing the blog content. The third column ("Author") is the user who posted the text in the first column or the author of the text in the first column. The author's information (e.g., name, profession, language style, etc.) is, in this example, retrieved from the same and/or other social networks, for instance, user's profiles, publications, speeches etc. The last column ("Content-specific dictionary") is, in this example, the dictionary that is made based on the context, field, domain etc., specifically for translating the text in the first column. In another example, the context-specific dictionary may also be used to translate other text in the same blog, and/or different blogs but with the same field or domain, etc.

Still referring to FIG. 2, in this example, the acronym "AT" refers to Assistive Technology, such as screen reader, used by a disabled user (e.g., blind) to access an electronic document. Without the context, the phrase "caption this for AT users" might be difficult to translate. However since, the context information drawn from the same blog from the social network is available, it is known that the phrase actually means some video content needs to be captioned so a user with hearing loss can view it.

Figure 3:
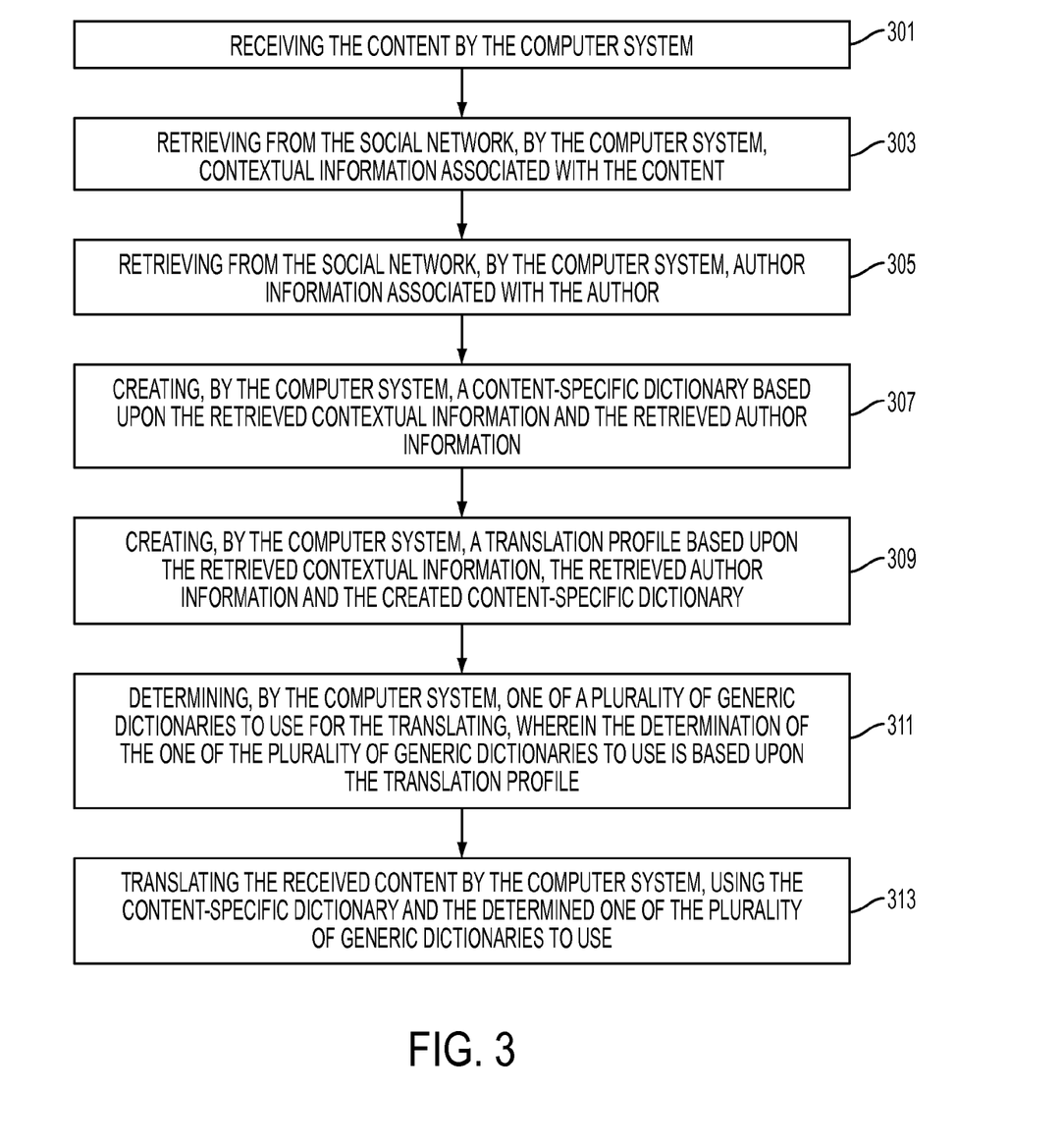
FIG. 3 depicts a block diagram of a method according to an embodiment of the present invention.

Referring now to FIG. 3, a method implemented in a computer system for translating content, wherein the content has an author who is part of a social network is shown. As seen in this FIG. 3, the method of this embodiment comprises: at 301—receiving the content by the computer system; at 303—retrieving from the social network, by the computer system, contextual information associated with the content; at 305—retrieving from the social network, by the computer system, author information associated with the author; at 307—creating, by the computer system, a content-specific dictionary based upon the retrieved contextual information and the retrieved author information (in one specific example, the content-specific dictionary contains key words (as discussed above, in one example, key words are those words that might have a different meaning in a different domain) and their translations in the target language; the key words may be determined, for example, through a domain-specific terminology); at 309—creating, by the computer system, a translation profile based upon the retrieved contextual information, the retrieved author information and the created content-specific dictionary (in one specific example, a translation profile contains the context information for the text to be translated, content-specific dictionary, and author's language and writing style and preferences, as well as regional, cultural styles); at 311—determining, by the computer system, one of a plurality of generic dictionaries to use for the translating, wherein the determination of the one of the plurality of generic dictionaries to use is based upon the translation profile; and at 313—translating the received content by the computer system, using the content-specific dictionary and the determined one of the plurality of generic dictionaries to use.

In one example, any steps may be carried out in the order recited or the steps may be carried out in another order.

Figure 4:
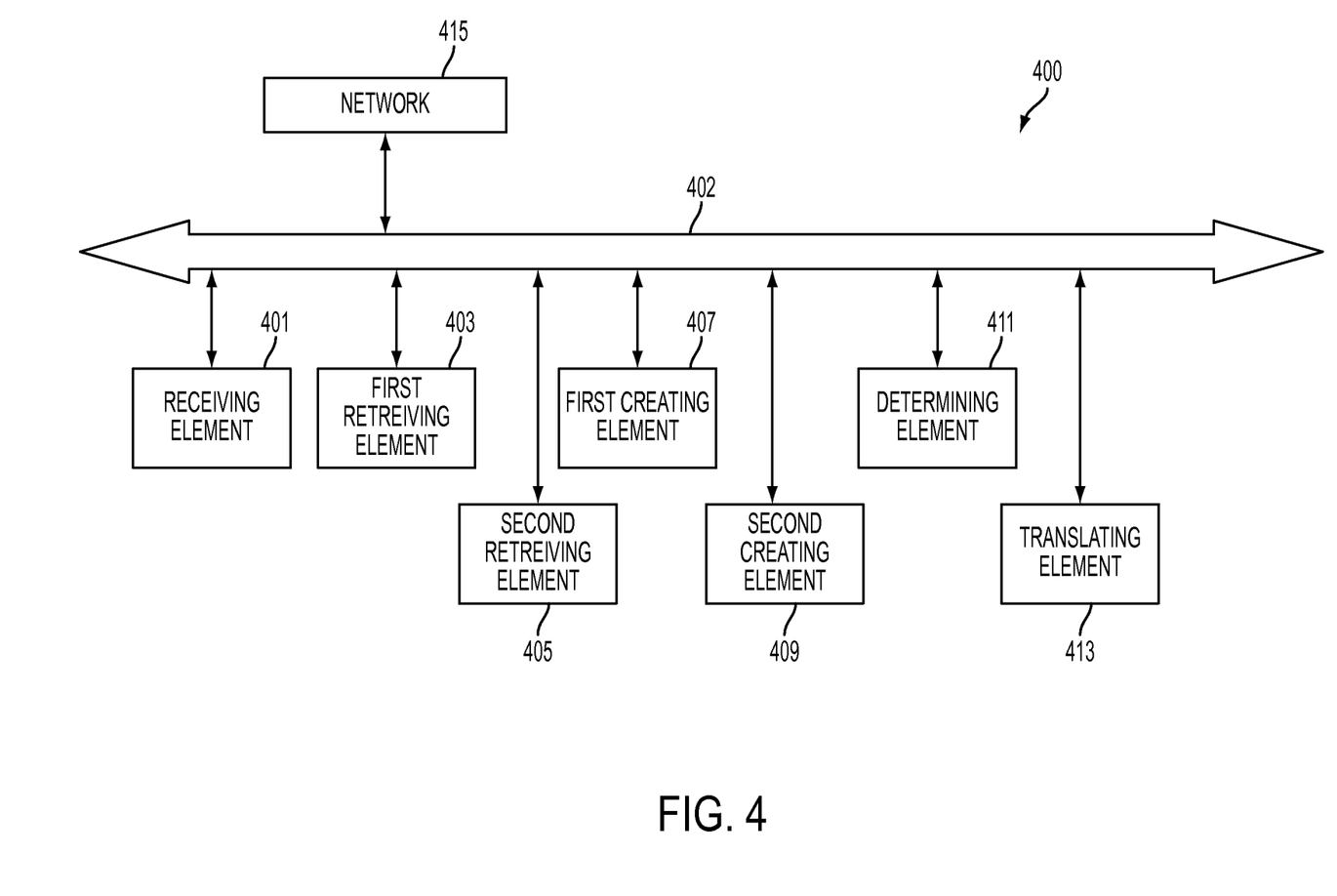
FIG. 4 depicts a block diagram of a system according to an embodiment of the present invention.

Referring now to FIG. 4, in another embodiment, a system 400 for translating content, wherein the content has an author who is part of a social network is provided. This system may include the following elements: a receiving element 401 configured to receive the content; a first retrieving element 403 configured to retrieve from the social network contextual information associated with the content; a second retrieving element 405 configured to retrieve from the social network author information associated with the author; a first creating element 407 configured to create a content-specific dictionary based upon the retrieved contextual information and the retrieved author information; a second creating element 409 configured to create a translation profile based upon the retrieved contextual information, the retrieved author information and the created content-specific dictionary; a determining element 411 configured to determine one of a plurality of generic dictionaries to use for the translating, wherein the determination of the one of the plurality of generic dictionaries to use is based upon the translation profile; and a translating element 413 configured to translate the received content using the content-specific dictionary and the determined one of the plurality of generic dictionaries to use.

Still referring to FIG. 4, each of the elements may be operatively connected together via system bus 402. In one example, communication between and among the various elements may be bi-directional. In another example, communication may be carried out via network 415 (e.g., the Internet, an intranet, a local area network, a wide area network and/or any other desired communication channel(s)). In another example, some or all of these elements may be implemented in a computer system of the type shown in FIG. 5.

In another embodiment, a method implemented in a computer system for translating content, wherein the content has an author who is part of a social network, is provided. The method of this embodiment comprises: receiving the content by the computer system; retrieving from the social network, by the computer system, contextual information associated with the content; retrieving from the social network, by the computer system, author information associated with the author; creating, by the computer system, a content-specific dictionary based upon the retrieved contextual information and the retrieved author information (in one specific example, the content-specific dictionary contains key words (as discussed above, in one example, key words are those words that might have a different meaning in a different domain) and their translations in the target language; the key words may be determined, for example, through a domain-specific terminology); creating, by the computer system, a translation profile based upon the retrieved contextual information, the retrieved author information and the created content-specific dictionary (in one specific example, a translation profile contains the context information for the text to be translated, content-specific dictionary, and author's language and writing style and preferences, as well as regional, cultural styles); and translating the received content by the computer system, using the content-specific dictionary.

In one example, the content-specific (or domain-specific) dictionary is applied first, before using any generic dictionary or dictionaries for the translating, wherein the content-specific dictionary is based upon the translation profile.

In another example, for the given text to be translated, the machine translation engine analyzes the text and for each word or phrase, the machine translation engine first consults the content-specific dictionary provided in the translation profile to see if a translation is available. If not, then the machine translation engine uses a generic dictionary (e.g., built into the machine translation engine) to translate the word/phrase. If the machine translation engine encounters an ambiguity word/phrase, the machine translation engine may consult the context information and/or author's language style, etc. to determine a more proper translation.

In another example, the method may further comprise determining, by the computer system, one of a plurality of generic dictionaries to use for the translating, wherein the determination of the one of the plurality of generic dictionaries to use is based upon the translation profile.

In another example, the determined one of the plurality of generic dictionaries to use for translating may be used by the machine translation engine to for translating.

Figure 5:
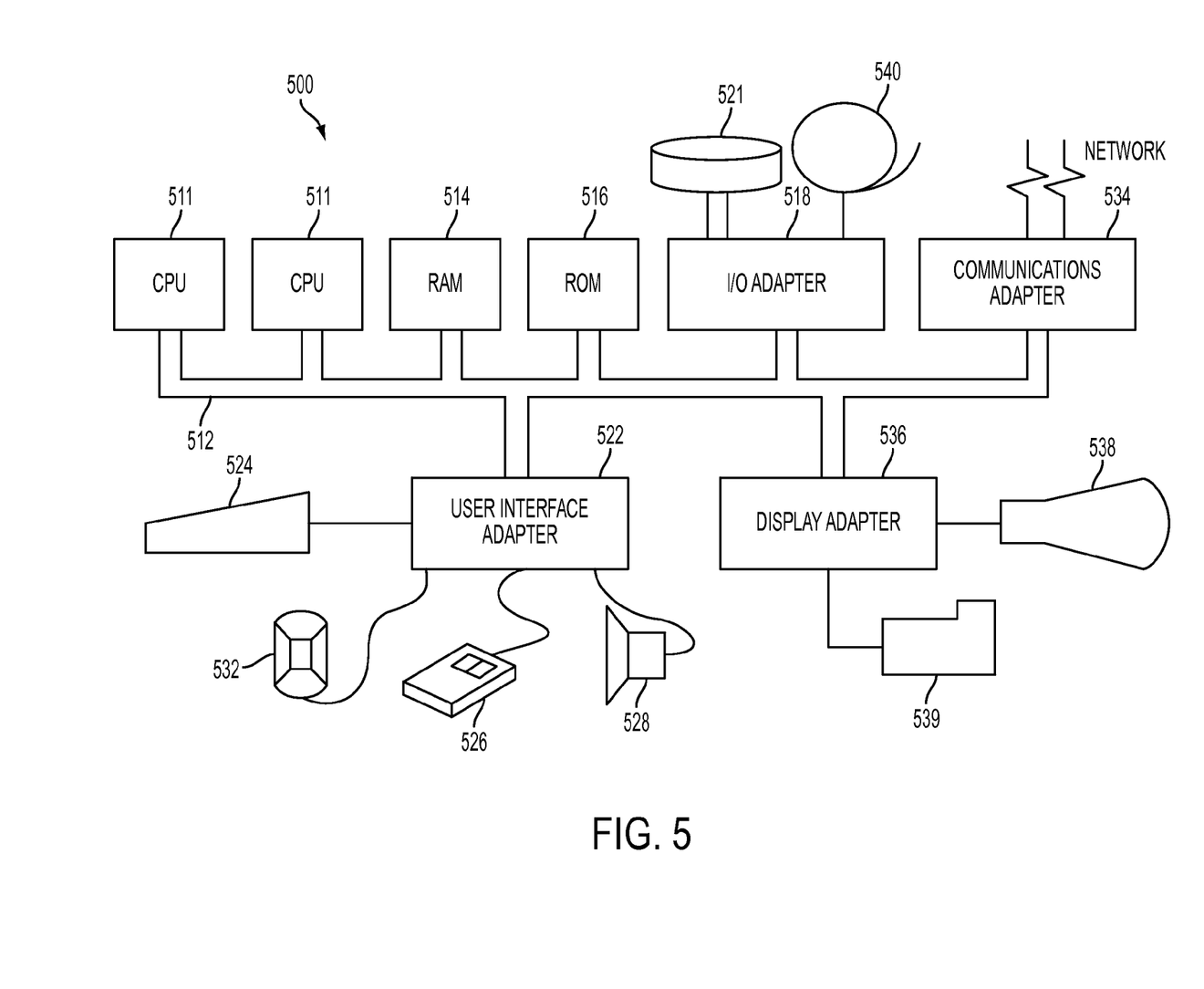
FIG. 5 depicts a block diagram of a system according to an embodiment of the present invention.

Referring now to FIG. 5, this figure shows a hardware configuration of computing system 500 according to an embodiment of the present invention. As seen, this hardware configuration has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communications adapter 534 for connecting the system 500 to a data processing network, the Internet, an Intranet, a local area network (LAN), etc., and a display adapter 536 for connecting the bus 512 to a display device 538 and/or printer 539 (e.g., a digital printer or the like).

In one embodiment, a method implemented in a computer system for translating content, wherein the content has an author who is part of a social network is provided, the method comprising: receiving the content by the computer system; retrieving from the social network, by the computer system, contextual information associated with the content; retrieving from the social network, by the computer system, author information associated with the author; creating, by the computer system, a content-specific dictionary based upon the retrieved contextual information and the retrieved author information; creating, by the computer system, a translation profile based upon the retrieved contextual information, the retrieved author information and the created content-specific dictionary; determining, by the computer system, one of a plurality of generic dictionaries to use for the translating, wherein the determination of the one of the plurality of generic dictionaries to use is based upon the translation profile; and translating the received content by the computer system, using the content-specific dictionary and the determined one of the plurality of generic dictionaries to use.

In one example, the content comprises a social network post by the author.

In another example, the content comprises words spoken by the author.

In another example, the words spoken by the author are received via a mobile device.

In another example, the contextual information comprises at least one of: (a) one or more descriptions; (b) one or more tags; (c) one or more comments; (d) one or more subjects; (e) one or more titles; (f) one or more topics; or (g) any combination thereof.

In another example, the author information comprises at least one of: (a) a writing style of the author; (b) a language style of the author; (c) a background of the author; (d) one or more personal preferences of the author; or (e) any combination thereof.

In another example, the background of the author comprises at least one of: (a) a regional background of the author; (b) a cultural background of the author; or (c) any combination thereof.

In another embodiment, a computer readable storage medium, tangibly embodying a program of instructions executable by the computer for translating content, wherein the content has an author who is part of a social network is provided, the program of instructions, when executing, performing the following steps: receiving the content; retrieving from the social network contextual information associated with the content; retrieving from the social network author information associated with the author; creating a content-specific dictionary based upon the retrieved contextual information and the retrieved author information; creating a translation profile based upon the retrieved contextual information, the retrieved author information and the created content-specific dictionary; determining one of a plurality of generic dictionaries to use for the translating, wherein the determination of the one of the plurality of generic dictionaries to use is based upon the translation profile; and translating the received content using the content-specific dictionary and the determined one of the plurality of generic dictionaries to use.

In one example, the content comprises a social network post by the author.

In another example, the content comprises words spoken by the author.

In another example, the words spoken by the author are received via a mobile device.

In another example, the contextual information comprises at least one of: (a) one or more descriptions; (b) one or more tags; (c) one or more comments; (d) one or more subjects; (e) one or more titles; (f) one or more topics; or (g) any combination thereof.

In another example, the author information comprises at least one of: (a) a writing style of the author; (b) a language style of the author; (c) a background of the author; (d) one or more personal preferences of the author; or (e) any combination thereof.

In another example, the background of the author comprises at least one of: (a) a regional background of the author; (b) a cultural background of the author; or (c) any combination thereof.

In another embodiment, computer-implemented system for translating content, wherein the content has an author who is part of a social network is provided, the system comprising: a receiving element configured to receive the content; a first retrieving element configured to retrieve from the social network contextual information associated with the content; a second retrieving element configured to retrieve from the social network author information associated with the author; a first creating element configured to create a content-specific dictionary based upon the retrieved contextual information and the retrieved author information; a second creating element configured to create a translation profile based upon the retrieved contextual information, the retrieved author information and the created content-specific dictionary; a determining element configured to determine one of a plurality of generic dictionaries to use for the translating, wherein the determination of the one of the plurality of generic dictionaries to use is based upon the translation profile; and a translating element configured to translate the received content using the content-specific dictionary and the determined one of the plurality of generic dictionaries to use.

In one example, the content comprises a social network post by the author.

In another example, the content comprises words spoken by the author.

In another example, the words spoken by the author are received via a mobile device.

In another example, the contextual information comprises at least one of: (a) one or more descriptions; (b) one or more tags; (c) one or more comments; (d) one or more subjects; (e) one or more titles; (f) one or more topics; or (g) any combination thereof.

In another example, the author information comprises at least one of: (a) a writing style of the author; (b) a language style of the author; (c) a background of the author; (d) one or more personal preferences of the author; or (e) any combination thereof.

In another example, the background of the author comprises at least one of: (a) a regional background of the author; (b) a cultural background of the author; or (c) any combination thereof.

In other examples, any steps described herein may be carried out in any appropriate desired order.

As described herein, a translation profile that contains, e.g., social contextual description of a content and an author's language and writing style can help an MT engine better select vocabularies, interpret and analyze the grammar, semantics, syntax of the content, and better determine other content-specific knowledge (e.g., to reduce ambiguity). For instance, identification of acronyms, terms, names and domain-specific vocabulary (e.g., legal documents) through a determined domain and written style may allow content can be translated more accurately.

In other embodiments, speech and/or text inputs and can be used to translate electronic text and word processing files, Internet web pages, Internet search results, electronic mail, instant messages, chat, SMS messages and/or other speech/textual communications for a variety of device types, including wireless devices.

As described herein, various embodiments may operate in the context of mobile devices (which, for example, may utilize machine translation on-the-fly). When a person speaks into a mobile device and desires that the spoken words be correctly translated to another language, the context may be critical. Each individual will typically have their own vocabulary and contexts. Accurate translation will be improved by each individual's context being determined and utilized. In another example, a history may be analyzed, as well as a history of other individuals and related contexts. In another example, an individual's utterances, colloquialisms, and contexts are analyzed and utilized.

As described herein, various embodiments may operate in the context of social computing, collaboration and communications. Various specific examples may operate in the context of: Software: Collaborative applications; Software: Content applications; Software: Information and data management; and/or Web Technology: Content management and use.

As described herein, mechanisms are provided for translating social network content (e.g., of an author). Such mechanisms may comprise: retrieving contextual information for the content from a social network (in various examples, the contextual information may include (but not be limited to) subject/topics, description, comments, tags and/or other related posts; analyzing the author's social profile(s), post(s), related video(s), related audio(s) and/or other electronic message(s) from one or more social networks to create features including (but not limited to): author's language style, personal preferences, regional, cultural and/or other language features; analyzing the contextual information and author's language background and style (e.g., based on the created features) to create a content-specific bilingual dictionary for source and target languages; creating a translation profile that contains the content-specific dictionary, author's background and style, as well as regional, cultural styles; and applying the translation profile to a machine translation engine to select the most proper generic dictionary and vocabulary to be used for the words or phrases that don't exist in the content-specific dictionary.

As described herein, a translation profile (including, e.g., author's language and writing style and preferences, as well as regional styles, cultural styles, as well as a content-specific bilingual dictionary) is specifically built to translate social content (e.g., wiki, blog, forum, etc.) from an author to a standardized language so that the content is clearer to readers of various backgrounds.

As described herein, the translation profile may be determined from a social network environment where the content is posted (such as, e.g., wiki, blog, forum), and the translation profile may determine language domain, scope, as well as author's language style and culture background.

As described herein, mechanisms are provided to generate a translation profile for initial (original) content based on the author of the initial (original) content.

As described herein, the translation profile (as well as a content-specific bilingual dictionary for source and target languages) may be author-dependent and content-dependent. For instance, a translation profile might be different for the same user when he posts a message in a mobile forum as compared to a literature forum because the language domain and scope are different.

As described herein, mechanisms are provided for using contextual information (e.g., author's language, social interaction, social profile, regional and cultural styles/preferences) from social networking site(s) for machine translation of languages. In one specific example, mechanisms are provided for: (a) creating a translation profile including a content specific dictionary, preferences of an author based on social profile of the author, and/or information retrieved from a social network (e.g. topics, posts, comments, tags, etc.); (b) selecting a bilingual dictionary based on the translation profile; (c) adding vocabulary words to the bilingual dictionary based on the translation profile; and (d) performing machine translation on text to be translated (wherein the translation is performed by determining an appropriate context).

In another example, the translation profile may be based on a social profile of a user wherein the social profile includes attributes like social network attributes, profession and location of the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method implemented in a computer system for translating content, wherein the content has an author who is part of a social network, the method comprising:
receiving the content by the computer system;
retrieving from the social network, by the computer system, contextual information associated with the content;
retrieving from the social network, by the computer system, author information associated with the author;
creating, by the computer system, a content-specific dictionary based upon the retrieved contextual information and the retrieved author information;
creating, by the computer system, a translation profile based upon the retrieved contextual information, the retrieved author information and the created content-specific dictionary;
determining, by the computer system, one of a plurality of generic dictionaries to use for the translating, wherein the determination of the one of the plurality of generic dictionaries to use is based upon the translation profile; and
translating the received content by the computer system, using the content-specific dictionary and the determined one of the plurality of generic dictionaries to use.

2. The method of claim 1, wherein the content comprises a social network post by the author.

3. The method of claim 1, wherein the content comprises words spoken by the author.

4. The method of claim 3, wherein the words spoken by the author are received via a mobile device.

5. The method of claim 1, wherein the contextual information comprises at least one of: (a) one or more descriptions; (b) one or more tags; (c) one or more comments; (d) one or more subjects; (e) one or more titles; (f) one or more topics; or (g) any combination thereof.

6. The method of claim 1, wherein the author information comprises at least one of: (a) a writing style of the author; (b)

a language style of the author; (c) a background of the author; (d) one or more personal preferences of the author; or (e) any combination thereof.

7. The method of claim 6, wherein the background of the author comprises at least one of: (a) a regional background of the author; (b) a cultural background of the author; or (c) any combination thereof.

8. A computer readable storage device, tangibly embodying a program of instructions executable by a computer for translating content, wherein the content has an author who is part of a social network, the program of instructions, when executing, performing the following steps:
receiving the content;
retrieving from the social network contextual information associated with the content;
retrieving from the social network author information associated with the author;
creating a content-specific dictionary based upon the retrieved contextual information and the retrieved author information;
creating a translation profile based upon the retrieved contextual information, the retrieved author information and the created content-specific dictionary;
determining one of a plurality of generic dictionaries to use for the translating, wherein the determination of the one of the plurality of generic dictionaries to use is based upon the translation profile; and
translating the received content using the content-specific dictionary and the determined one of the plurality of generic dictionaries to use.

9. The computer readable storage device of claim 8, wherein the content comprises a social network post by the author.

10. The computer readable storage device of claim 8, wherein the content comprises words spoken by the author, and wherein the words spoken by the author are received via a mobile device.

11. The computer readable storage device of claim 8, wherein the contextual information comprises at least one of: (a) one or more descriptions; (b) one or more tags; (c) one or more comments; (d) one or more subjects; (e) one or more titles; (f) one or more topics; or (g) any combination thereof.

12. The computer readable storage device of claim 8, wherein the author information comprises at least one of: (a) a writing style of the author; (b) a language style of the author; (c) a background of the author; (d) one or more personal preferences of the author; or (e) any combination thereof.

13. The computer readable storage device of claim 12, wherein the background of the author comprises at least one of: (a) a regional background of the author; (b) a cultural background of the author; or (c) any combination thereof.

14. A computer-implemented system for translating content, wherein the content has an author who is part of a social network, the system comprising:
a receiving element configured to receive the content;
a first retrieving element configured to retrieve from the social network contextual information associated with the content;
a second retrieving element configured to retrieve from the social network author information associated with the author;
a first creating element configured to create a content-specific dictionary based upon the retrieved contextual information and the retrieved author information;
a second creating element configured to create a translation profile based upon the retrieved contextual information, the retrieved author information and the created content-specific dictionary;
a determining element configured to determine one of a plurality of generic dictionaries to use for the translating, wherein the determination of the one of the plurality of generic dictionaries to use is based upon the translation profile; and
a translating element configured to translate the received content using the content-specific dictionary and the determined one of the plurality of generic dictionaries to use.

15. The system of claim 14, wherein the content comprises a social network post by the author.

16. The system of claim 14, wherein the content comprises words spoken by the author.

17. The system of claim 16, wherein the words spoken by the author are received via a mobile device.

18. The system of claim 14, wherein the contextual information comprises at least one of: (a) one or more descriptions; (b) one or more tags; (c) one or more comments; (d) one or more subjects; (e) one or more titles; (f) one or more topics; or (g) any combination thereof.

19. The system of claim 14, wherein the author information comprises at least one of: (a) a writing style of the author; (b) a language style of the author; (c) a background of the author; (d) one or more personal preferences of the author; or (e) any combination thereof.

20. The system of claim 19, wherein the background of the author comprises at least one of: (a) a regional background of the author; (b) a cultural background of the author; or (c) any combination thereof.

21. The computer readable storage device of claim 8, wherein the computer readable storage device comprises at least one of: (a) a portable computer diskette; (b) a hard disk; (c) a random access memory; (d) a read-only memory; (e) an erasable programmable read-only memory; (f) a portable compact disc read-only memory; (g) an optical storage device; (h) a magnetic storage device; and (i) any combination thereof.

* * * * *